April 18, 1967    H. J. KOEBER, JR    3,314,349
LIGHT SOURCE CONTROLLED FILTER ACTUATING MECHANISM
FOR MOTION PICTURE CAMERA
Filed Aug. 14, 1964    3 Sheets-Sheet 1

INVENTOR
Henry J. Koeber Jr.
BY Barry L. Clark
John E. Peeler Jr.
Attys

April 18, 1967  H. J. KOEBER, JR  3,314,349
LIGHT SOURCE CONTROLLED FILTER ACTUATING MECHANISM
FOR MOTION PICTURE CAMERA
Filed Aug. 14, 1964  3 Sheets-Sheet 3

INVENTOR.
Henry J. Koeber Jr.
BY Barry L. Clark
John E. Peeler Jr.
Attys

United States Patent Office 3,314,349
Patented Apr. 18, 1967

3,314,349
LIGHT SOURCE CONTROLLED FILTER ACTUATING MECHANISM FOR MOTION PICTURE CAMERA
Henry J. Koeber, Jr., Deerfield, Ill., assignor to Bell & Howell Company, Chicago, Ill., a corporation of Illinois
Filed Aug. 14, 1964, Ser. No. 389,634
13 Claims. (Cl. 95—12.20)

The present invention relates to improvements in photographic apparatus and particularly to the operation of a built-in Type "A" filter in a moton picture camera.

It is well known today that most color films are "color balanced" for exposure in artificial light or daylight and that most cameras have built-in Type "A" filters to permit the camera operator to use artificial light balanced color film under both daylight and artificial light conditions. Usually, the operator must manually actuate a lever to insert a filter in or remove a filter from the optical path to change the color balance of the light when going from one light condition to another or from one film to another.

When indoors, it is customary to use a light source such as photo floods or quartz iodide type lamps with the camera. The color temperature of the light from light sources is usually selected for proper color balance with artificial light balanced color films. When these are used, the Type "A" filter is not required in the optical path. However, upon again using daylight, such filter is required. Thus, with conventional cameras and light sources, when the operator changes from artificial light to daylight or the reverse, he must remember to change the position of the filter.

Although provided with automatic control of the filter, the camera operator may wish to override the automatic operation, by removing the filter from the optical path or to manually control the filter, in the absence of automatic actuating structures such as to obtain special effects or to make use of a light source having another color balance characteristic, e.g. that of daylight. The operator may readily accomplish these results with the manual control of the present invention.

An object of the present invention is to provide a mechanism to automatically make the necessary changes in the position of the color balance correcting filter relative to the optical path when the user turns the light source on or off.

Another object is to provide a novel manual control to permit operation of a built-in filter by the operator when the filter has been positioned in the optical path of the camera by the automatic control provided by actuation of the light source.

Still another object is to provide a novel mechanism for operation in a camera of a built-in filter either manually or automatically.

An additional object of the present invention is to provide a novel apparatus to automatically actuate a built-in filter relative to the optical path of a camera when a film cartridge is inserted into the cartridge chamber of the camera.

Another additional object is to provide a novel coupling device for actuation of a filter in a camera by the actuation of the actuating control of a light source.

Further objects of the invention will appear from the description as hereinafter set forth in connection with the appended claims and the accompanying drawings wherein:

FIGURE 1 discloses some of the elements of a camera having a built-in filter, the camera housing having a light source attached thereto.

Figure 1:
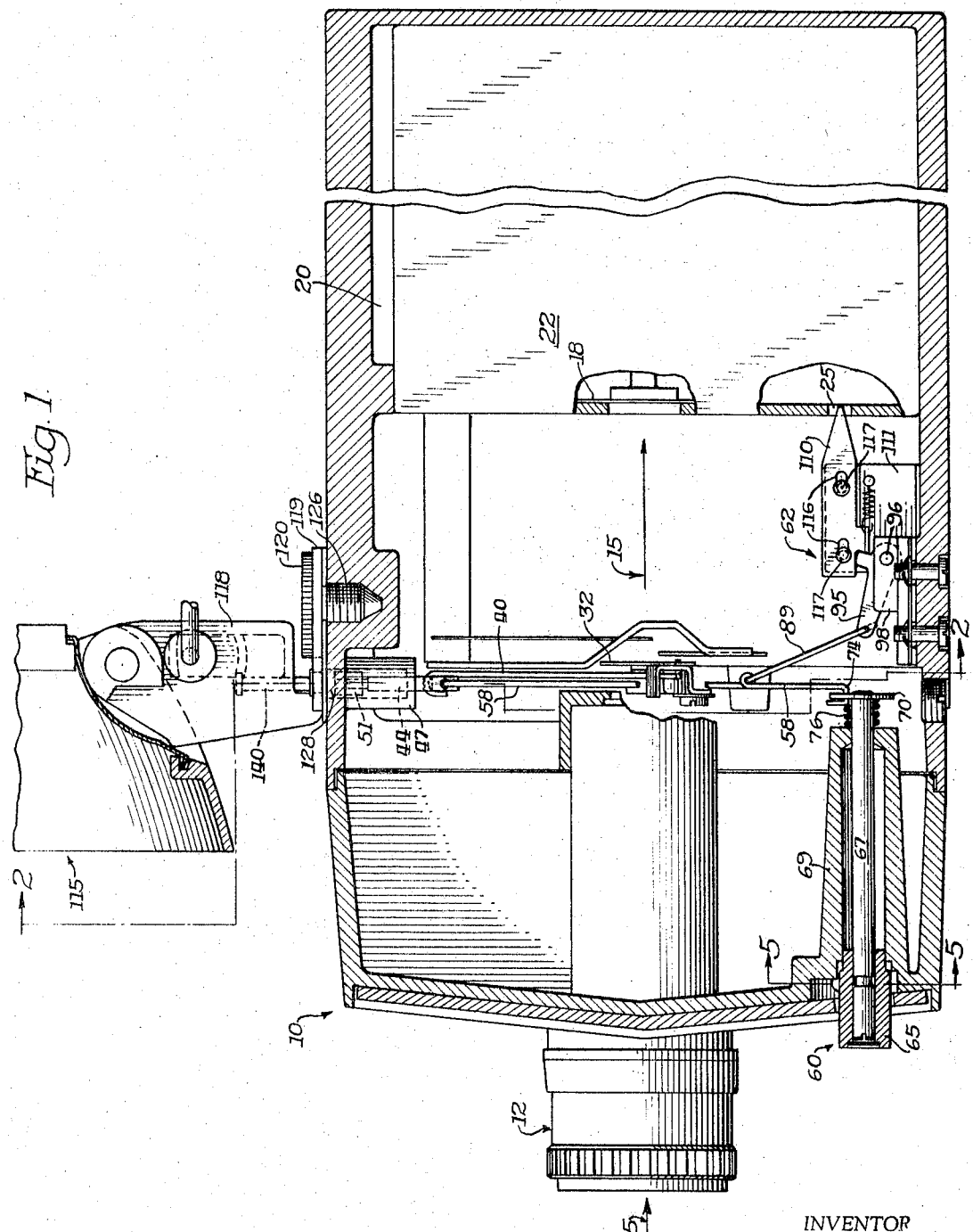

Disclosed in FIGURE 1 is a portion of the camera housing 10 having an objective 12 through which light rays pass along an optical path 15 to expose film 18 in a known manner. The film is available on spools and in cartridge and magazines which are inserted in the appropriate manner into a film chamber 20 in camera housing 10. In this embodiment, the film chamber of the camera is intended to accept a cartridge 22 which has an appropriately positioned notch 25 to indicate that Type "A" or artificial light balanced color film is supplied in that cartridge. Cartridges supplied with other than Type "A" balanced color film will not have a notch 25. A Type "A" or other color balance correcting filter 30 of conventional glass, gelatin or other types is supported in a mount portion 32 of a plate 34 which is pivotally moved about an axis 36 which extends through a screw or rivet in housing 10. Plate 34 has a locating leg 37 to engage a part of housing 10 to serve as a stop when the filter is positioned in the optical path 15. Filter support plate 34 may also be mounted for other types of movement relative to optical path, such as reciprocation.

Figure 3:
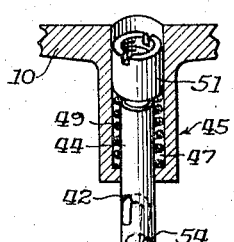
FIGURE 3 is a perspective view of an embodiment of the present novel construction.

As more clearly seen in FIGURE 3, an actuator link 40 extends through a hole 39 in plate 34. The other end of link 40 extends through a hole 42 in rod 44 of a filter actuating or plunger assembly 45. The rod is longitudinally movable in and through a socket 47 in the upper portion of housing 10 between an upper position and a lower position. Through link 40, plate 34 is caused to pivot and move filter 30 either into or out of optical path 15.

Filter actuating assembly 45 is normally biased outwardly of housing 10 by a resilient element, such as coiled spring 49, which is positioned between the bottom of socket 47 and a bushing 51. The bushing is internally threaded to be adjusted on a reduced threaded portion 52 of rod 44 to permit compensating for manufacturing tolerances of the effective length of link 40 to position filter 30 completely out of the optical path when an exteriorly attached controller, such as a light source actuating switch, is inserted in the socket.

A slot 54 also extends through the lower portion of rod 44 to permit passage there through a hooked end of a connector link 58. This connector link extends beyond the plate pivot axis 36 to that portion of housing 10 in which a manual actuator assembly 60 and/or the cartridge actuated assembly 62 are located.

In this embodiment, the manual actuator assembly 60 extends through the lower front portion of housing 10 to permit the camera operator to rotate a knob 65 to remove the filter from path 16. Knob 65 is attached by a screw 66 to the end of a rotatable shaft 67 which extends into and through an elongated bearing 69 formed in housing 10. On the interior end of shaft 67 is fixedly mounted a disk 70 having an arcuate slot 72 therein. Through slot 72 extends a U-shaped end 74 of connector link 58. Surrounding the shaft 67 between the disk 70 and the interior of bearing 69 is a coil spring 76 which biases the shaft inwardly of housing 10. This permits the head of set screw 66 on knob 65 to engage one of a pair of stops 80, 82. These stops are formed in bearing 69 with cam surfaces 84, 95 leading to a shelf 86 from bottoms 87, 88 of the respective stops. Set screw 66 is normally seated against one of the stops. When the knob 65 is rotated and set screw 66 is removed from either stop 80 or 82 to be moved to the other, the set screw will move the knob against the biasing of spring 76 as it rides up one of the cam surfaces 84, 85, over the shelf 86 and down the other cam to the other stop.

Figure 4:
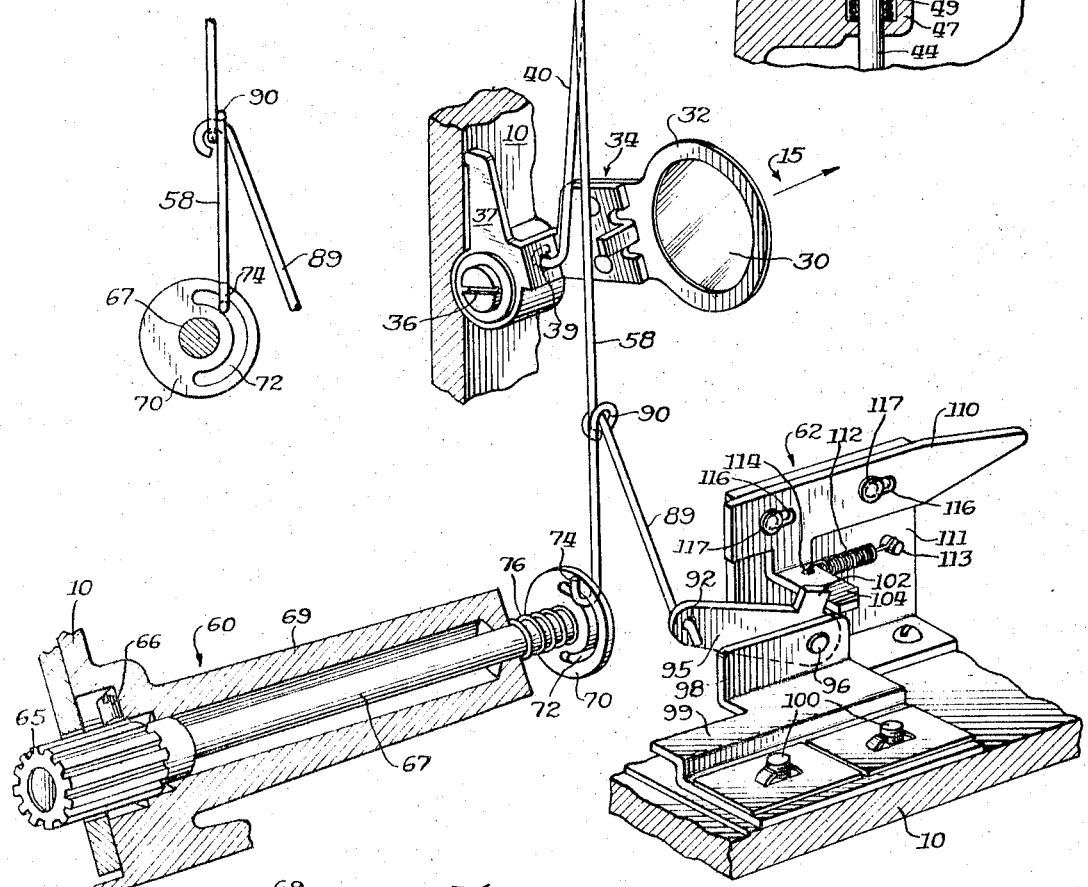
FIGURE 4 is an enlarged view taken along line 4—4 in FIGURE 3.
Figure 6:
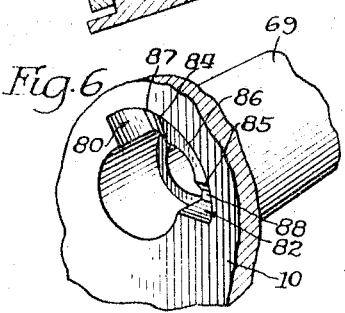
FIGURE 6 is a perspective view of the housing portion of the view in FIGURE 5.
Figure 5:
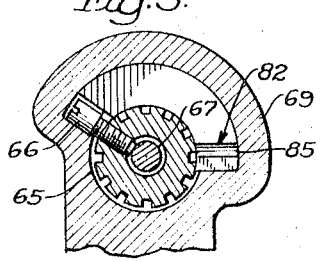
FIGURE 5 is a view taken along line 5—5 of FIGURE 1.

The cartridge actuated assembly 62 is connected to connector link 58 by a feeler connector rod 89 which may also be a direct connector with filter actuating assembly 45, if manual control is not desired. One end of rod 80 extends through a ring 90 formed by bending connector link 58 (as seen in FIGURE 4). The other end of rod 89 extends through a hole 92 in an end of a bell crank 95 pivoted about an axis 96 through a screw or rivet. This pivot axis is substantially perpendicular to an upstanding lug 98 of an L-shaped plate 99. The plate is adjustably fixed to housing 10 by well known attaching means 100. A leg 102 on bell crank 95 engages a foot 104 on an elongated longitudinally movable cartridge feeler 110. Foot 104 is bent to extend substantially perpendicular from the body of the feeler. The feeler is mounted to move relative to a plate 111 attached to housing 10. A spring 112 attached to a lug 113 extending from plate 111 is connected through a hole 114 to bias the feeler inwardly of cartridge chamber 20. Alignment and the extent of sliding movement of feeler 110 is determined by slot 116 in the feeler and headed members 117, which extend through the slots into plate 99.

Figure 2:
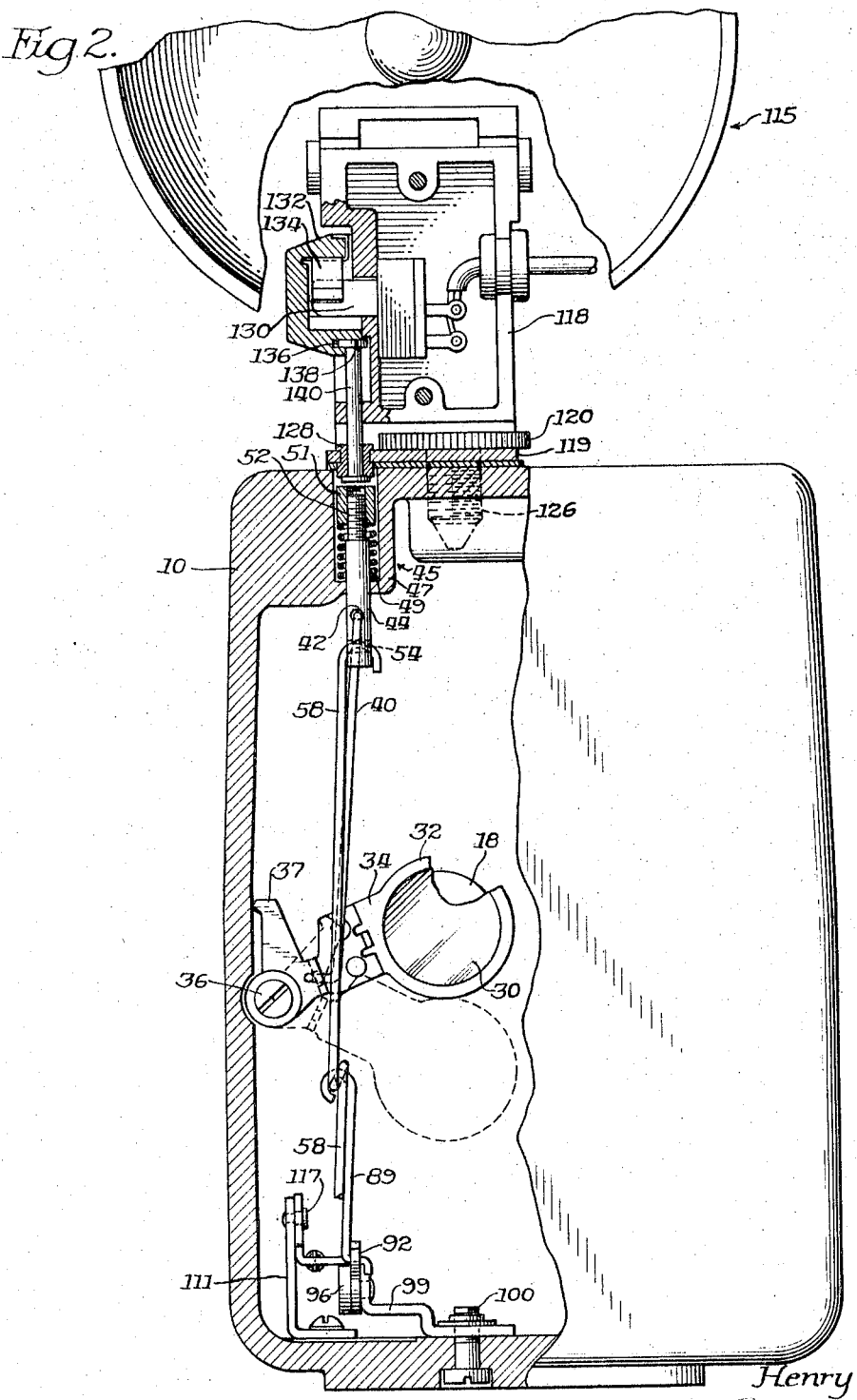
FIGURE 2 is a view in partial section taken along line 2—2 of FIGURE 1.

As seen in FIGURES 1 and 2, a typical portable light source 115, is attached to camera housing 10. The light is supported on a handle or bearer portion 118. Extending through a plate 119 to which the handle is attached is a thumb screw 120 threadably secured in a known manner into a mating socket 126 in housing 10. Also forming a part of the handle is an alignment sleeve 128 which is insertable into socket 47. A power control switch 130 on the handle is slidably moved by the operator to turn the light on and off. A cap 132 has a spring clip 134 in its interior to frictionally engage the surface of switch 130. Cap 132 has, in its lower portion, a shaped notch 136 into which the headed portion 138 of an elongated pusher 140 is slipped. The cap thus causes the pusher to be moved through sleeve 128, when the switch is moved to turn the light on, so as to actuate the filter actuating mechanism.

In terms of operation, filter mount plate 34 may be actuated through any one of the three described assemblies which may be used together or separately in a particular camera. When a cartridge 22 is inserted in film or cartridge chamber 20, the presence or absence of notch 25 will determine if feeler 110 is to be actuated and filter 30 placed in or removed from the optical path. When notch 25 is present, as in a cartridge supplied with Type "A" balanced color film, the feeler is not moved and the filter remains in its normal "in" position. However, when the detent is absent, as with daylight balanced color film or black and white film, the feeler is moved against the biasing of spring 112 (away from the cartridge chamber) thus rotating bell crank 95 counterclockwise about the axis 96 to urge feeler connector rod 89 downwardly. This movement of feeler connector rod 89 causes similar downward movement of connector link 58, filter actuating assembly 45, and actuator link 40 against the biasing of plunger spring 49. As link 40 moves downwardly, plate 34 is caused to rotate to remove filter 30 from optical path 15 to permit exposing the film without filtration. Filter 30 will not remain in the optical path if either of the other assemblies is actuated for "out."

When the light source 115 is mounted on housing 10 and turned "on" by control switch 130, pusher 140 extending through sleeve 128 is moved inwardly of the housing to depress filter actuating assembly 45 to move actuator rod 40 and therefore rotate plate 34 such that the filter is removed from the light path. If the camera is of the cartridge type with a feeler 110, and the film is Type "A" (notched cartridge), the leg 102 of the crank is allowed to move out of engagement with foot 104 of the feeler body until the light switch is moved to cut off the light source and spring 49 returns to normal. Thus, the position of feeler 110 is not changed. If the film was other than Type "A" (no notch), feeler 110 would have already moved the crank and the filter actuating assembly 45. Referring to the manual control assembly, knob 65 may be in either the "in" or "out" position with the set screw 66 against either stop 80 or 82. The U-shaped end 74 of connector link 58 extends through arcuate slot 72 in disc 70, intermediate the ends of the slot. This intermediate position is selected to permit movement of link end 74 by the other assemblies without rotating knob 65. When neither of the other assemblies are actuated, or are not in the camera, or the operator desires to manually remove the filter from the optical path, knob 65 is rotated to the "out" position and thereby rotates disc 70 sufficiently that the upper end of arcuate slot 72 (as seen in FIGURE 3, before rotation) will pull the connector link 58 downwardly and cause rotation of plate 34 and thereby move filter 30 to an "out" position. Similarly, to manually return the filter 30 to an "in" position, knob 65 is rotated in the opposite direction (counterclockwise) until set screw 66 engages stop 80. When the stop is engaged, spring 49 will return filter 30 to the optical path.

Figure 7:
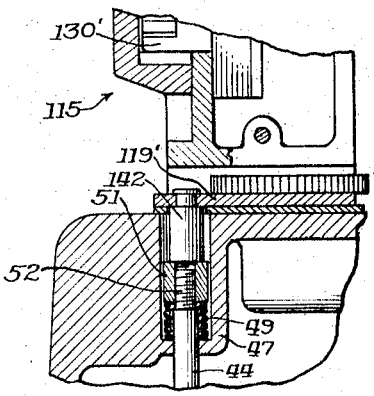
FIGURE 7 is a partial section of a modified light source actuator.

A novel means has been disclosed above for coupling the light source and the filter controls so that actuation of the light switch 130 will actuate the filter. However, it is also within the contemplation of the present invention to provide a "semi-automatic" control of the filter position in the camera by a light source 115' (FIGURE 7) by providing a rigid actuator member 142 fixedly mounted in mounting plate 119' so as to be inserted into socket 47 in camera housing 10 when the light source is attached to the housing. Thus, rigid actuator member 142 continually holds the filter actuating assembly 45 depressed so that filter 30 is out of the optical path whenever the light source 115' is in position on the camera. Such a rigid actuator member would, of course, require the light source to be removed from the camera to permit the filter to move into the optical path when it is desired to expose artificial light balanced color film by daylight.

It will be understood that modifications and variations may be effected without departing from the scope of the novel concepts of the instant invention.

I claim as my invention:

1. In combination with a motion picture camera having a housing and an objective through which light rays pass along an optical path to a film,
   a light source on said housing,
   movable switch means for actuating said light source,
   filter means selectively movable into and out of the optical path,
   a filter actuating assembly movable between a first position wherein said filter means is in said optical path and a second position wherein said filter means is out of said optical path, and
   means movable by said switch means to cooperate with said filter actuating assembly in said camera whereby said filter means is caused to be moved relative to said optical path when said switch means is moved.

2. In combination with a motion picture camera having a housing and an objective through which light rays pass along an optical path to a film,
   a light source adapted to be mounted with respect to said housing,
   color balancing filter means in the housing selectively movable into and out of the optical path,
   a filter actuating assembly including a rod movable relative to the housing, means cooperating with said rod to bias said rod in one direction relative to said housing, actuator means on said light source adapted to engage said rod, and means connecting said rod and said filter means to cause said filter means to be moved when said rod is moved against said biasing means by said actuator means.

3. In combination with a motion picture camera having a housing and an objective through which light rays pass along an optical path to film, a light source exterior of said housing, switch means for actuating said light source, said switch means being movable between a first position and a second position, a filter means selectively movable into and out of the optical path, said filter means being adapted to be used to alter the color balance of light reaching a color film intended for use under one light condition, a filter actuating assembly in said housing movable between a first position and a second position, and means movable by said switch means to cooperate with said filter actuating assembly in said camera whereby said filter means is caused to be moved relative to said optical path to alter the color balance of light reaching the film as said switch means cooperates with said filter actuating assembly upon movement between said first position and said second position with the resultant change in lighting conditions.

4. The combination with a motion picture camera as in claim 3, a manually rotatable control assembly including a disc having an arcuate slot therein;

linkage means connected to said filter means and extending through said slot of said disc wherein when said manual control assembly is rotated, said linkage means is caused to rotate until a portion of said disc engages said linkage means extending through said slot in said disc and moves same, so as to rotate said filter relative to said optical path.

5. In combination with a motion picture camera having a housing and an objective through which light rays pass along an optical path to film in the film chamber of the housing, a light source adapted to be mounted on said housing, a filter actuating member movable between two positions on said light source, filter means in the housing selectively movable between a first position and a second position relative to said optical path, actuation means in the housing for moving said filter means in response to movement of said filter actuating member, said actuation means including a filter actuating assembly having a biasing means, and link means connecting said assembly to said filter means, said filter actuating assembly being normally biased in one direction relative to said housing by said biasing means to maintain said filter in said first position relative to said optical path, and being movable against said biasing means by said filter actuating member to cause said filter means to be moved to said second position, a manual control assembly, said manual control assembly including a shaft means extending to the exterior of said camera housing, a pair of stop means in said housing, and a stop engaging means on said shaft means adapted to engage one or the other of said stop means when said shaft means is manually actuated to move said filter means relative to said optical path.

6. In the improvement as in claim 5, wherein the film chamber accepts a cartridge having film therein, said cartridge having a notch when one type of film is in said cartridge and not having a notch when another type of film is in said cartridge;

a notch feeler assembly cooperating with said filter actuating assembly through second linkage means, said feeler assembly including a feeler member movably mounted in said housing and extending into said film chamber to seek said notch, and a bell crank member in operative engagement with said feeler member, said crank member being connected to said second linkage means whereby when said notch is present in said cartridge, said feeler member extends therein and through said filter actuating assembly actuates said filter means relative to said optical axis.

7. In the improvement as defined in claim 5, wherein said manual control assembly includes a disc on said shaft, said disc having an arcuate slot therethrough of greater arcuate length than the arcuate distance between said stop means, said second linkage means extending through said arcuate slot whereby when said filter actuating assembly is actuated, said linkage means moves freely in said slot and when said manual control assembly is actuated, a portion of said disc engages said second linkage means to cause said filter means to be moved relative to said optical path.

8. In combination with a motion picture camera having a housing and an obective through which light rays pass along an optical path to film in the film chamber in the housing:

a light source mounted relative to said camera, switch means on said light source to actuate said light source, means movable by said switch means to cooperate with filter actuating means in said camera, said filter actuating means including a rod means, and a biasing means, said rod means being operably connected to filter means, said biasing means normally maintaining said rod means in a first position such that said filter means is in the optical path, and said rod means being movable against said biasing means when said switch means of said light source is actuated and said cooperating means engages said filter actuating assembly to move said filter means from said optical path.

9. In combination with a motion picture camera having a housing and an objective through which light rays pass along an optical path to film in the film chamber of the housing:

a light source mounted on said housing, switch means adapted to actuate said light source;

filter means selectively movable between a first position and a second position relative to the optical path;

actuation means for moving said filter means, said actuation means including a filter actuating assembly and a feeler assembly;

said first assembly having a biasing means, link means connecting said assembly and said filter means, said assembly being normally biased in one direction relative to said housing by said biasing means to maintain said filter means in said first position relative to said optical path when said switch means is in one position and in said second position when said switch means is in the other position;

said feeler assembly including a feeler means normally extending into the film chamber to seek a notch in the cartridge, and a crank means normally in engagement with said feeler means, said link means further connecting said crank means to said filter means, whereby when said feeler assembly is actuated by absence of said notch, said filter means is moved to said second position relative to said optical path.

10. In combination with a motion picture camera having a housing and an objective through which light rays pass along an optical path to film in the film chamber of the housing,
- a light source mounted on said housing,
- slidably movable switch means adapted to actuate said light source when selectively moved between a first position and a second position,
- filter means selectively movable between a first position and a second position relative to the optical path, and
- actuation means for moving said filter means, said actuation means including a filter actuating assembly,
- said assembly including link means connecting said assembly to said filter means,
- means normally biasing said assembly outwardly relative to said housing to maintain said filter in said first position relative to said optical path when said switch means is in said first position, and
- a pusher means connected to said switch means and in operative engagement with said actuation means whereby when said switch means is moved to said second position, said filter means is caused to be moved to a second position relative to the optical path.

11. In combination with a motion picture camera having a housing and an objective through which light rays pass along an optical path to film in a cartridge in the film chamber of the housing,
- the cartridge having a notch means when one type of film is provided therein, and said notch being absent when another type of color film is provided therein,
- a light source mounted on said housing,
- said light source having a characteristic to be used with film in the cartridge having notch means,
- switch means adapted to actuate said light source upon movement from a first position to a second position,
- filter means selectively movable between a first position in said optical path, and a second position out of said optical path,
- said filter means being adapted to change the characteristic of the light reaching the film to permit the film supplied in the cartridge with a notch to be used when said light source is not actuated and said filter is in said first position and when said light source is actuated by movement of said switch means to a second position, said filter means is moved to said second position out of said optical path;
- actuation means for moving said filter means,
- said actuation means including a filter actuating assembly,
- said assembly including a rod movable relative to said housing,
- link means connecting said rod to said filter means, and
- biasing means normally urging said rod and filter means in one direction relative to said housing to maintain said filter in said first position relative to said optical path;
- said actuation means further including a feeler assembly including feeler means normally extending into the film chamber to seek a notch in the cartridge, means urging said feeler means into said film chamber, said feeler means being mounted for sliding movement relative to said housing;
- a pivotable crank means in engagement with said feeler means,
- linkage means connected to said crank means and said filter means through said link means of said filter actuating assembly whereby said filter means is normally in the optical path when a cartridge means has a notch means and said filter means is out of said optical path when a cartridge is without a notch means;
- said actuation means further including a manual override control assembly, said assembly including a shaft, extending through said housing,
- a pair of arcuately spaced stop means in said housing,
- cam means adjacent each said stop means,
- a disc on the interior end of said shaft,
- means between said disc and a portion of said housing biasing said shaft inwardly of said housing,
- a knob on the exterior end of said shaft,
- said disc having an arcuate slot therethrough of greater arcuate length than the arcuate distance between said stop means,
- link means of said filter actuating assembly extending through said arcuate slot and connecting said assembly to said filter means, and
- a stop engaging means on said knob adapted to engage one of said stop means when said knob is manually actuated
- wherein a portion of said disc engages said link means to cause said filter means to be moved relative to said optical path, and
- wherein when said stop engaging means is moved to said other stop means, said stop engaging means and said shaft are caused to be moved by one said cam means against the urging of said biasing means until said stop engaging means is guided by said other cam means to said other stop means and said shaft means returns to its normal position.

12. A coupling device for a light bar intended to be used with a motion picture camera including a housing and a color balance correcting filter movable relative to an optical path in the camera, said filter being adapted to alter the color characteristic of film in the camera when in the optical path and when the film is to be exposed by a light source having characteristics other than those of artificial light, the camera having an actuating means for moving the filter from the optical path when actuated; the light bar adapted to be mounted relative the camera for use therewith and said light bar having a power control switch movable between an on position and an off position, the device comprising:
- frictionally engaging means cooperating with said control switch means to move said switch means,
- said frictionally engaging means further having a notch means in one portion,
- pusher means mounted in said light bar and including a head portion adapted to be engaged in said notch means,
- said light bar having a body portion, and
- a sleeve portion on said body portion,
- said sleeve portion being adapted to be inserted into said camera housing,
- wherein said pusher means extends into said sleeve portion whereby when said switch means is moved from said off position to said on position, said pusher is moved through said sleeve portion to engage said filter actuating means in said camera to move said filter relative to said optical path.

13. A light source having a coupling device and intended to be used with and mounted on a motion picture camera including a housing having a socket portion therein and a color balance correcting filter movable relative to an optical path in the camera, said filter being adapted to alter the color characteristic of the film in the camera when in the optical path and when the film is to be exposed by a light source having characteristics other than those of artificial light, the camera having an actuating means for moving the filter from the optical path when actuated; the light source and coupling device comprising a power control switch on said light source slidably movable between an on position and an off position,
- means cooperating with said control switch adapted to be manually engaged to slide said switch, means interior of said manually engaged means adapted to frictionally engage said switch,
said manually engaged means further having a notch in one portion,
an elongated, longitudinally movable pusher member including a head portion,
said head portion being of complementary shape to said notch and adapted to be engaged in said notch to be moved by said manually engaged means,
said light source having a body portion, and
a sleeve portion on said body portion,
said sleeve portion being adapted to be inserted into said socket portion into which said filter actuating means extends,
wherein said pusher member extends into said sleeve portion whereby when said switch is moved from said off position to said on position, said pusher member is moved longitudinally through said sleeve portion to engage said filter actuating means in said camera to move said filter relative to said optical path.

References Cited by the Examiner

UNITED STATES PATENTS

| | | | |
|---|---|---|---|
| 2,794,365 | 6/1957 | Baasner | 88—24 |
| 3,095,563 | 7/1963 | Weisglass | 88—24 |
| 3,176,599 | 4/1965 | Anwyl | 95—10 |
| 3,208,363 | 9/1965 | Easterly | 95—11 |

JOHN M. HORAN, *Primary Examiner.*